(12) United States Patent
Zeng

(10) Patent No.: US 8,477,925 B2
(45) Date of Patent: Jul. 2, 2013

(54) CALL METHOD, DEVICE, AND COMMUNICATION SYSTEM FOR PRIVATE BRANCH EXCHANGE USER

(71) Applicant: Fangui Zeng, Guangdong (CN)

(72) Inventor: Fangui Zeng, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/633,346

(22) Filed: Oct. 2, 2012

(65) Prior Publication Data

US 2013/0028405 A1 Jan. 31, 2013

Related U.S. Application Data

(63) Continuation of application No. PCT/CN2011/074185, filed on May 17, 2011.

(30) Foreign Application Priority Data

Sep. 3, 2010 (CN) .......................... 2010 1 0273383

(51) Int. Cl.
*H04M 7/00* (2006.01)
*H04M 3/42* (2006.01)

(52) U.S. Cl.
USPC ................. 379/219; 379/211.02; 379/220.01; 379/221.01; 379/231

(58) Field of Classification Search
USPC .................. 379/219, 211.02, 220.01, 221.01, 379/231, 234, 232
See application file for complete search history.

(56) References Cited

U.S. PATENT DOCUMENTS

| | | |
|---|---|---|
| 2006/0023658 A1 | 2/2006 | Phillips et al. |
| 2008/0261592 A1 | 10/2008 | Finizole E Silva et al. |
| 2010/0075642 A1* | 3/2010 | Ejzak et al. ................ 455/414.1 |
| 2010/0153567 A1 | 6/2010 | Lu et al. |

FOREIGN PATENT DOCUMENTS

| | | |
|---|---|---|
| CN | 101132410 A | 2/2008 |
| CN | 101170748 A | 4/2008 |
| CN | 101184082 A | 5/2008 |
| CN | 101719912 A | 6/2010 |
| WO | WO 2008/058486 A1 | 5/2008 |

OTHER PUBLICATIONS

Supplementary European Search Report dated Jan. 17, 2013 in connection with European Patent Application No. EP 11 77 7198.
Written Opinion of the International Searching Authority dated Aug. 25, 2011 in connection with International Patent Application No. PCT/CN2011/074185.
PCT International Search Report mailed Aug. 25, 2011, issued in related International Application No. PCT/CN2011/074185, Huawei Technologies Co., Ltd. (4 pages).
ETSI TS 182 025, V2.1.1 (Sep. 2008), Telecommunications and Internet converged Services and Protocols for Advanced Networking (TISPAN); Business trunking; Architecture and functional description (43 pages).

* cited by examiner

*Primary Examiner* — Thjuan K Addy

(57) ABSTRACT

A call method, a device, and a communication system for a private branch exchange (PBX) user are provided. User data of the private branch exchange user may be sent to an application server when the private branch exchange user has opened an account but not registered. The application server may continue normal calling by using the user data of the private branch exchange user. The PBX user can make a successful call without independent registration when implementing independent supplementary services.

13 Claims, 3 Drawing Sheets

CALL METHOD, DEVICE, AND COMMUNICATION SYSTEM FOR PRIVATE BRANCH EXCHANGE USER

CROSS-REFERENCE TO RELATED APPLICATIONS

This application is a continuation of International Application No. PCT/CN2011/074185, filed on May 17, 2011, which claims priority to Chinese Patent Application No. 201010273383.1, filed on Sep. 3, 2010, both of which are hereby incorporated by reference in their entireties.

FIELD OF THE INVENTION

The present invention relates to the communications technology field, and in particular, to a call method, a device, and a communication system for a private branch exchange (PBX: Private Branch Exchange) user.

BACKGROUND OF THE INVENTION

In a traditional enterprise network communication solution, PBX or Internet Protocol private branch exchange (IP PBX) devices occupy a large proportion. The methods of PBX/IP PBX for accessing a public switched telephone network (PSTN: Public Switched Telephone Network) or next generation network (NGN: Next Generation Network) include the following: 1) private E1/T1 line; 2) basic rate access (BRA: Basic Rate Access) or integrated services digital network (ISDN: Integrated Services Digital Network) private line; 3) analog subscriber line; 4) H.323 IP relay; 5) session initiation protocol (SIP: Session Initiation Protocol) relay. A traditional PBX device is in an interworking relationship with a public network. The operator network provides enterprise PBXs with a method for accessing the public network, and seldom provides additional services for PBX devices.

With the fast development of Internet Protocol multimedia subsystem (IMS: IP Multimedia Subsystem), the traditional enterprise PBX solution also evolves toward the IMS network. The telecommunications and Internet converged services and protocols for advanced networking (TISPAN: Telecommunications and Internet converged Services and Protocols for Advanced Networking) defines two PBX access methods: 1) accessing the IMS via a user-network interface (UNI: User-Network Interface); 2) accessing the IMS via a network-network interface (NNI: Network-Network Interface). The former is a subscription-based method for accessing the IMS network, and enables the IMS network to provide various value-added services for a PBX user. The latter regards a PBX as a peer network for accessing the IMS, where the IMS provides only access for the PBX to the public network, but does not provide additional value-added services.

During evolution of the traditional enterprise PBX solution to the IMS network, as the MS network uses SIP as the basic communication protocol, while the SIP protocol requires that a user must send a registration message so as to acquire the location information about the user, the TISPAN standard introduces a concept of wildcard (wildcard) registration, where one PBX switch only needs to and one registration message, and the IP multimedia public identity (IMPU: IP Multimedia Public Identity) registered by the user and a wildcard IMPU (generally an operator allocates one number segment for use by an enterprise) are presented by means of implicit registration set, thereby solving the registration problem.

As most PBX switches are capable of providing rich services and functions, they do not rely on an application server (AS: Application Server) to provide additional supplementary services. However, it is still necessary to move certain value-added services to the AS due to the restriction on the PBX networking or for the sake of service optimization. A typical example of the restriction of PBX networking is that the PBX may not independently provide fixed mobile convergence (FMC: Fixed Mobile Convergence) applications, but relies on capabilities of the IMS network.

The IMS network uses SIP as the basic communication protocol, and the SIP protocol requires that a user must send a registration message so as to acquire the location information about the user. Therefore, a PBX user that implements independent services must register before successfully initiating a call. As such, if certain PBX users hope to implement respective independent supplementary services, they need to independently open an account in the IMS domain, and must independently register. Therefore, the PBX is required to initiate registration flows for multiple users, increasing the handling load of network elements, and bringing additional work to the PBX switch, which does not comply with the operation rules for an enterprise PBX.

SUMMARY OF THE INVENTION

Embodiments of the present invention provide a call method, a device, and a communication system for a private branch exchange user, so that the PBX user may make a successful call without independent registration when implementing independent supplementary services.

An embodiment of the present invention provides a call method for a private branch exchange user, including:

receiving a data query request sent by a Call Session Control Function, where the data query request includes a number of a private branch exchange user, the data query request is sent by the Call Session Control Function after the Call Session Control Function receives a call request sent by the private branch exchange user, and the call request includes the number of the private branch exchange user;

if the private branch exchange user has opened an account but not registered, sending a data query success response to the Call Session Control Function, where the data query success response includes information about a wildcard user corresponding to the private branch exchange user;

receiving a user data request from an application server, where the user data request includes the number of the private branch exchange user, and the user data request is sent by the application server after the application server receives the call request forwarded by the Call Session Control Function; and sending a user data response to the application server, where the user data response includes user data of the private branch exchange user.

Another embodiment of the present invention provides a call device for a private branch exchange user, including:

a receiving handling unit, configured to: receive a data query request sent by a Call Session Control Function, where the data query request includes a number of a private branch exchange user, the data query request is sent by the Call Session Control Function after the Call Session Control Function receives a call request sent by the private branch exchange user, and the call request includes the number of the private branch exchange user; receive a user data request from an application server, where the user data request includes the number of the private branch exchange user, and the user data request is sent by the application server idler the application server receives the call request forwarded by the Call Session Control Function; and a sending handling unit, configured to: after the receiving handling unit receives the data query request and determines that the private branch exchange user has opened an account but not registered, send a data query success response to the Call Session Control Function, where the data query success response includes information about a wildcard user corresponding to the private branch exchange user; send a user data response to the application server, where the user data response includes user data of the private branch exchange user.

Another embodiment provides a communication system, including:

a Call Session Control Function, configured to: receive a call request sent by a private branch exchange user. Where the call request includes a number of the private branch exchange user; send a data query request to a call device for the private branch exchange user, where the data query request includes the number of the private branch exchange user; receive a data query success response sent by the call device for the private branch exchange user, where the data query success response includes information about a wildcard user corresponding to the private branch exchange user; and forward the call request to an application server;

the call device for the private branch exchange user, configured to: receive the data query request; send the data query success response to the Call Session Control Function; receive a user data request from the application server, where the user data request includes the number of the private branch exchange user; and send a user data response to the application server, where the user data response includes user data of the private branch exchange user; and the application server, configured to: receive the call request and send the user data request to the call device for the private branch exchange user; receive the user data response, and use the user data of the private branch exchange user to continue normal calling.

From the technical solutions provided in the embodiments of the present invention, it may be learned that, because the call device for the private branch exchange user in the embodiments of the present invention sends a data query response that includes information about the wildcard user corresponding to the private branch exchange user to the CSCF after receiving the data query request sent by the CSCF even if the private branch exchange user has not registered on the call device for the private branch exchange user, so that the CSCF may therefore forward the call request to the AS to continue a call; alter the user data request sent by the AS is received, user data of the private branch exchange user may be sent to the AS even if the private branch exchange user has not registered on the call device for the private branch exchange user, so that the AS may use the user data of the private branch exchange user to continue normal calling. In this way, the PBX user can successfully make a call without independent registration when implementing independent supplementary services, and the PBX can initiate a registration flow of only one user, thereby reducing the handling load of network elements and complying with operation rules for an enterprise PBX.

BRIEF DESCRIPTION OF THE DRAWINGS

For a better understanding of the technical solutions in the embodiments of the present invention, the accompanying drawings for illustrating the embodiments are briefly described below. Apparently, the accompanying drawings in the following description illustrate only some embodiments of the present invention, and a person skilled in the art may derive other accompanying drawings from these accompanying drawings without creative efforts.

DETAILED DESCRIPTION OF THE EMBODIMENTS

The technical solutions under the present invention are described below with reference to the accompanying drawings. Apparently, the embodiments described below are for the exemplary purpose only without, covering all embodiments of the present invention. All other embodiments obtained by a person skilled in the art based on the embodiments given herein without making any creative effort are covered in the protection scope of the present invention.

Figure 1:
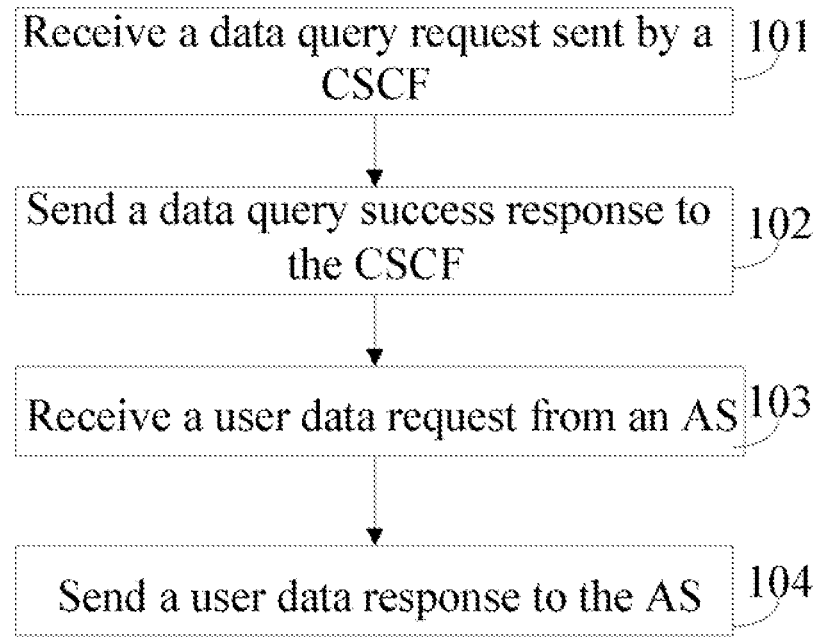
FIG. 1 is a flow chart of a call method for a private branch exchange user according to an embodiment of the present invention.

A call method for a private branch exchange user provided in an embodiment of the present invention is described. FIG. 1 is a flow chart of a call method for a private branch exchange user according to an embodiment of the present invention. This embodiment describes a handling process of a call device for the private branch exchange user. The call device for the private branch exchange user may specifically be a home subscriber server (HSS: Home Subscriber Server). This embodiment includes the following 101: Receive a data query request sent by a Call Session Control Function (CSCF: Call Session Control Function).

The data query request includes a number of a private branch exchange user, the data query request is sent by the CSCF after the CSCF receives a call request sent by the private branch exchange user, and the call request includes the number of the private branch exchange user.

The data query request received by the call device for the private branch exchange user may be sent by the CSCF via a CX or DX interface After receiving the data query request, the call device for the private branch exchange user may query relevant information about the private branch exchange user according to the number of the private branch exchange user carried in the data query request.

The CSCF may specifically be a serving CSCF (SCSCF: Serving CSCF), a proxy CSCF (PCSCF: Proxy CSCF), or an interrogating CSCF (ICSCF: Interrogating CSCF), and so on.

102: If the private branch exchange user has opened an account but not registered, send a data query success response to the CSCF, where the data query success response includes information about a wildcard user corresponding to the private branch exchange user. Sending the data query success response to the CSCF enables the CSCF to forward a call request to an AS.

In an embodiment of the present invention, the call device for the private branch exchange user queries relevant information about the private branch exchange user according to the number of the private branch exchange user. If it is determined that the private branch exchange user has opened an account but not registered, a data query success response may be sent to the CSCF The data query success response includes the information about the wildcard user corresponding to the private branch exchange user, so that the CSCF can learn that the wildcard user corresponding to the private branch exchange user has already registered, and therefore the CSCF can forward the call request to the AS.

If it is determined that the private branch exchange user has opened an account and has already registered, a data query success response may be sent to the CSCF. However, the data query success response includes the information about the private branch exchange user, so that the CSCF can learn that the private branch exchange user has already registered, and to forward the call request to the AS.

If it is determined that the private branch exchange user has not opened an account, and the wildcard user corresponding to the private branch exchange user has not registered, a data query failure response may be sent to the CSCF, so that the CSCF does not forward the call request to the AS.

In another embodiment of the present invention, when determining that the private branch exchange user has opened an account but not registered, the call device for the private branch exchange user does not immediately send a data query success response to the CSCF, but further needs to determine whether a wildcard user corresponding to the private branch exchange user has already registered. The call device for the private branch exchange user sends the data query success response to the CSCF only when the wildcard user corresponding to the private branch exchange user has already registered. In this embodiment, the execution sequence for determining that the private branch exchange user has opened an account but not registered and determining whether the wildcard user corresponding to the private branch exchange user has already registered is not limited.

In another embodiment of the present invention, when determining that the private branch exchange user has opened an account but not registered, the call device for the private branch exchange user does not immediately send a data query success response to the CSCF, but further needs to determine whether user data of the private, branch exchange user includes a flag bit, where the flag bit is used to indicate that the user data of the private branch exchange user is not open to the CSCF. The call device for the private branch exchange user sends the data query success response to the CSCF only when the user data of the private branch exchange user includes the flag bit. In another embodiment of the present invention, the data query request is sent by the CSCF via the CX or DX interface; therefore, the flag bit may be used to indicate that the user data is not: open to a network element connected by the CX or DX interface, so that the flag bit indicates that the user data of the private, branch exchange user is not open to the CSCF.

In another embodiment of the present invention, when determining that the private branch exchange user has opened an account but not registered, the call device for the private branch exchange user does not immediately send a data query success response to the CSCF, but further needs to determine whether a wildcard user corresponding to the private branch exchange user has already registered and whether user data of the private branch exchange user includes a flag bit, where the flag bit is used to indicate that the user data of the private branch exchange user is not open to the CSCF. The call device for the private branch exchange user sends the data query success response to the CSCF only when the wildcard user corresponding to the private branch exchange user has already registered and the user data of the private branch exchange user includes the flag bit. Whether the wildcard user corresponding to the private branch exchange user has already registered may be first determined, or whether the user data of the private branch exchange user includes the flag bit may be first determined.

103: Receive a user data request from the AS, where the user data request includes the number of the private branch exchange user, and the user data request is sent by the AS after the AS receives the call request forwarded by the CSCF.

The user data request received by the call device for the private branch exchange user may be sent by the AS via an SH interlace. After receiving the data query request, the call device for the private branch exchange user may query relevant information about the private branch exchange user according to the number of the private branch exchange user carried in the user data request.

104: Send a user data response to the AS, where the user data response includes the user data of the private branch exchange user. Sending the user data response to the AS enables the AS to use the user data of the private branch exchange user to continue normal calling.

In an embodiment of the present invention, before sending the user data response to the AS, the call device for the private branch exchange user may further determine whether the user data of the private branch exchange user includes a flag bit, where the flag bit is used to indicate that the user data of the private branch exchange user is open to the AS. The call device for the private branch exchange user sends the user data response to the AS if the user data of the private branch exchange user includes the flag bit. In an embodiment of the present invention, the data query request sent by the AS is sent via the SH interface; therefore, the flag bit may be used to indicate that the user data is open to a network element connected by the SH interface, so that the flag hit indicates that the user data of the private branch exchange user is open to the AS.

In an embodiment of the present invention, the flag hit indicating that the user data of the private branch exchange user is open to the AS and the flag bit indicating that the user data of the private branch exchange user is not open to the CSCF are the same flag bit; in another embodiment of the present invention, the flag bit indicating that the user data of the private branch exchange user is open to the AS and the flag bit indicating that the user data of the private branch exchange user is not open to the CSCF are different flag bits.

It may be learned from the above that, after receiving the data query request sent by the CSCF, the call device for the private branch exchange user in the embodiment of the present invention can send a data query response that includes information of a wildcard user corresponding to the private branch exchange user to the CSCF even if the private branch exchange user has not registered on the call device for the private branch exchange user, so that the CSCF may forward the call request to the AS to continue a call; after the user data request sent by the AS is received, user data of the private branch exchange user may be sent to the AS even if the private branch exchange user has not registered on the call device for the private branch exchange user, so that the AS may use the user data of the private branch exchange user to continue normal calling. In this way, the PBX user can successfully make a call without independent registration when implementing independent supplementary services, and the PBX can initiate a registration process of only one user, thereby reducing the handling load of network elements, and complying with operation rules for an enterprise PBX.

The following describes the call method for the private branch exchange user provided in this embodiment with specific examples. Assume that numbers allocated to a company are all numbers in Shenzhen starting with 2878, and user data of all the numbers is set in advance on the HSS. Assume that the following user data need to be set: independent user data of a user sip: +8675528780000@huawei.com and a user sip: +8675528780001@huawei.com, and user data of a wildcard user sip: +867552878!.*!@huawei.com. Assume that the user sip: +8675528780000@huawei.com and the wildcard user sip: +867552878!.*!@huawei.com are in a same implicit registration set. In this case, only the user sip: +8675528780000@huawei.com needs to initiate registration. The HSS sets the registration status of the user sip: +8675528780000@huawei.com to registered, and also sets the registration status of the wildcard user sip: +867552878!.*!@huawei.com to registered, that is, all users starting with sip: +867552878 are registered in the HSS.

In an embodiment of the present invention, the user sip: +8675528780001@huawei.com initiates a call to the network side, and sends a call request to the CSCF, where the call request includes a user number of the user sip: +8675528780001@huawei.com.

After receiving the call request, the CSCF sends a data query request via the CX or DX interface to the HSS, where the data query request includes the user number sip: +8675528780001@huawei.com.

After receiving the data query request, the HSS determines that the user sip: +8675528780001@huawei.com has opened an account but not registered, the wildcard user sip: +867552878!.*!huawei.com has already registered, and the user data of the user sip: +8675528780001@huawei.com includes a flag hit that indicates that the user data of the user is not open to the CSCF (a network element connected by the CX or DX interface). Then the HSS returns a data query success response to the CSCF, and carries, in the data query success response, user data of the wildcard user sip: +867552878!.*!@huawei.com, but not user data of the user sip: +8675528780001@huawei.com.

After receiving the data query success response, the CSCF directly forwards the received call request to the AS.

After receiving the call request, the AS sends the user data request via the SH interface to the HSS, where the user data request includes the user number of the user sip: +8675528780001@huawei.com After receiving the user data request, the HSS determines that the user sip: +8675528780001@huawei.com has opened an account but not registered, the wildcard user sips: +867552878!.*!huawei.com has already registered, and the user data of the user sip: +8675528780001@huawei.com includes a flag hit that indicates that the user data of the user is open to the AS (a network element connected by the SH interface). Then the HSS returns a user data response to the AS, and carries, in the user data response, user data of the user sip: +8675528780001@huawei.com, but not user data of the wildcard user sip: +867552878!.*!@huawei.com.

After receiving the user data response, the AS continues normal calling according to the user data of the user sip: +8675528780001@huawei.com.

In another embodiment of the present invention, the user sip: +8675528780002@huawei.com initiates a call to the network side. The user sip: +8675528780002@huawei.com has not opened an account in the HSS, but the wildcard user sip: +867552878!.*!@huawei.com has already registered. Therefore, the HSS returns user data of the wildcard user sip:sip: +867552878!.*!@huawei.com to the AS, so that the AS may only continue normal calling according to the user data of the wildcard user sip:sip: +867552878!.*!@huawei.com.

It may be learned from the above that, in this embodiment, after receiving the data query request sent by the CSCF, the HSS sends a data query response that includes information about the wildcard user corresponding to the private branch exchange user to the CSCF even if the private branch exchange user has not registered on the call device for the private branch exchange user, so that the CSCF may forward the call request to the AS to continue a call; after the user data request sent by the AS is received, user data of the user may also be sent to the AS even if the user has not registered on the HSS, so that the AS may use the user data of the user to continue normal calling. In this way, the PBX user can successfully make a call without independent registration when implementing independent supplementary services, and the PBX can initiate a registration process of only one user, thereby reducing the handling load of network elements and complying with operation rules for an enterprise PBX.

It should be noted that, for the ease of description, the preceding, method embodiments are expressed as a series of action combinations. However, a person skilled in the art should know that, the present invention is not confined to the described action sequences because certain steps may use other sequences or be implemented synchronously according to the present invention. A person skilled in the art also should know that, all the embodiments described in the specifications belong to exemplary embodiments, and the involved actions or modules are not certainly necessary to the present invention.

The call device for the private branch exchange user provided in the embodiment of the present invention is further introduced. The call device for the private branch exchange user provided in the embodiment of the present invention may be used as an HSS.

Figure 2:
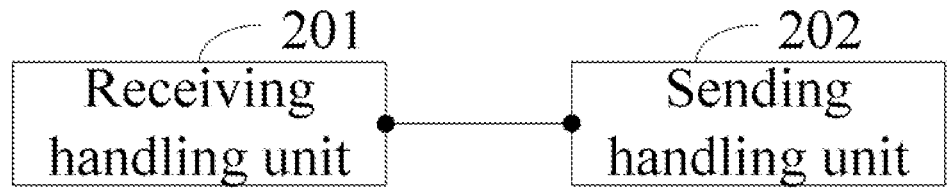
FIG. 2 is a structural schematic diagram of a call device for a private branch exchange user according to an embodiment of the present invention.

FIG. 2 is a structural schematic diagram of a call device for a private branch exchange user according to an embodiment of the present invention, including:

a receiving handling unit 201, configured to: receive a data query request sent by a CSCF, where the data query request includes a number of a private branch exchange user, the data query request is sent by the CSCF after the CSCF receives a call rawest sent by the private branch exchange user, and the call request includes the number of the private branch exchange user; receive a user data request from an AS, where the user data request includes the number of the private branch exchange user, and the user data request is sent by the AS after the AS receives the call request forwarded by the CSCF; and a sending handbag unit 202, configured to: after the receiving handling unit 201 receives the data query request and determines that the private branch exchange user has opened an account but not registered, send a data query success response to the CSCF, where the data query success response includes information about a wildcard user corresponding to the private branch exchange user, send a user data response to the AS, where the User data response includes user data of the private branch exchange user.

Sending the data query success response to the CSCF enables the CSCF to forward the call request to the AS, sending the user data response to the AS enables the AS to use the user data of the private branch exchange user to continue normal calling.

It may be learned from the above that after receiving a data query request sent by the CSCF, the call device for the private branch exchange user in the embodiment of the present invention sends a data query response that includes information of the wildcard user corresponding to the private branch exchange user to the CSCF even if the private branch exchange user has not registered on the call device for the private branch exchange user, so that the CSCF may forward the call request to the AS to continue a call; after the user data request sent by the AS is received, user data of the private branch exchange user may be sent to the AS even if the private branch exchange user has not registered on the call device for the private branch exchange user, so that the AS may use the user data of the private branch exchange user to continue normal calling. In this way, the PBX user can successfully make a call without independent registration when implementing independent supplementary services, and the PBX can initiate a registration process only one user, thereby reducing the handling load of network elements and complying with operation rules for an enterprise PBX.

Figure 3:
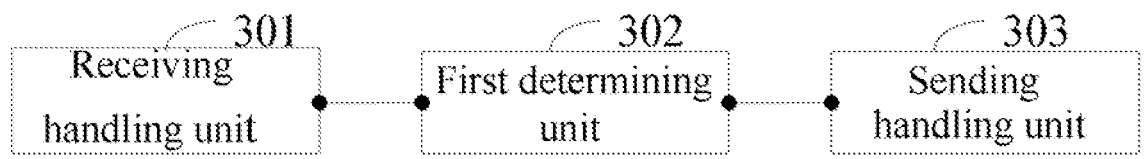
FIG. 3 is a structural schematic diagram of a call device for a private branch exchange user according to another embodiment of the present invention.

FIG. 3 is a structural schematic diagram of a call device for a private branch exchange user according to another embodiment of the present invention, including:

a receiving handling unit 301, configured to: receive a data query request sent by a CSCF, where the data query request includes a number of a private branch exchange user, the data query request is sent by the CSCF after the CSCF receives a call request sent by the private branch exchange user, and the call request includes the number of the private branch exchange user; receive a user data request from an AS, where the user data request includes the number of the private branch exchange user, and the user data request is sent by the AS after the AS receives the call request forwarded by the CSCF;

a first determining unit 302, configured to determine whether user data of the private branch exchange user includes a flag bit after the receiving handling unit 301 receives the data query request, were the flag bit is used to indicate that the user data of the private branch exchange user is not open to the CSCF; and a sending handling unit 303, configured to send a data query success response to the CSCF after the first determining unit 302 determines that the user data of the private branch exchange user includes the flag bit, where the data query success response includes information about a wildcard user corresponding to the private branch exchange user; send a user data response to the AS, where the user data response includes the user data of the private branch exchange user.

It may be learned from the above that, after receiving the data query request sent by the CSCF, the call device for the private branch exchange user in the embodiment of the present invention sends a data query response that includes information of the wildcard user corresponding to the private branch exchange user to the CSCF even if the private branch exchange user has not registered on the call device for the private branch exchange user, so that the CSCF may forward the call request to the AS to continue a call; after the user data request sent by the AS is received, user data of the private branch exchange user may be sent to the AS even if the private branch exchange user has not registered on the call device for the private branch exchange user, so that the AS may use the user data of the private branch exchange user to continue normal calling. In this way, the PBX user can successfully make a call without independent registration when implementing independent supplementary services, and the PBX can initiate a registration process of only one user, thereby reducing the handling load of network elements and complying with operation rules for an enterprise PBX.

Figure 4:
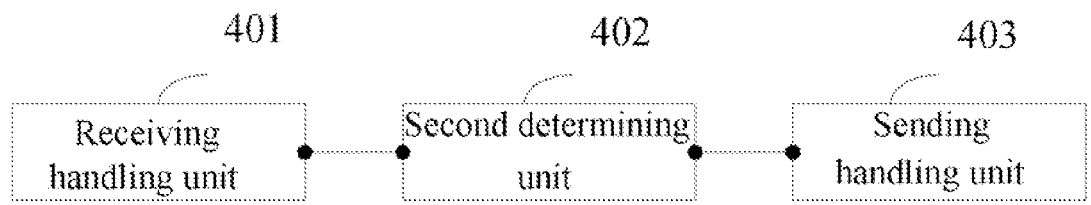
FIG. 4 is a structural schematic diagram of a call device for a private branch exchange user according to another embodiment of the present invention.

FIG. 4 is a structural schematic diagram of a call device for a private branch exchange user according to another embodiment of the present invention, including:

a receiving handling unit 401, configured to: receive a data query request sent by a CSCF, where the data query request includes a number of a private branch exchange user, the data query request is sent by the CSCF after the CSCF receives a call request sent by the private branch exchange user, and the call request includes the number of the private branch exchange user; receive a user data request from an AS, where the user data request includes the number of the private branch exchange user, and the user data request is sent by the AS after the AS receives the call request forwarded by the CSCF;

a second determining unit 402, configured to determine whether a wildcard user corresponding to the private branch exchange user has already registered after the receiving handling unit 401 receives the data query request; and a sending handling unit 403, configured to send a data query success response to the CSCF after the second determining unit 402 determines that the wildcard user corresponding to the private branch exchange user has already registered, where the data query success response includes information about the wildcard user corresponding to the private branch exchange user; send a user data response to the AS, where the user data response includes user data of the private branch exchange user.

Sending the data query success response to the CSCF enables the CSCF to forward the call request to the AS; sending the user data response to the AS enables the AS to use the user data of the private branch exchange user to continue normal calling.

It may be learned from the above that, after receiving a data query request sent by the CSCF, the call device for the private branch exchange user in the embodiment of the present invention sends a data query response that includes information of the wildcard user corresponding to the private branch exchange user to the CSCF even if the private branch exchange user has not registered on the call device for the private branch exchange user, so that the CSCF may forward the call request to the AS to continue a call; after the user data request sent by the AS is received, user data of the private branch exchange user may be sent to the AS even if the private branch exchange user has not registered on the call device for the private branch exchange user, so that the AS may use the user data of the private branch exchange user to continue normal calling. In this way, the PBX user can successfully make a call without independent registration when implementing independent supplementary services, and the PBX can initiate a registration process of only one user, thereby reducing the handling load of network elements and complying with operation rules for an enterprise PBX.

Figure 5:
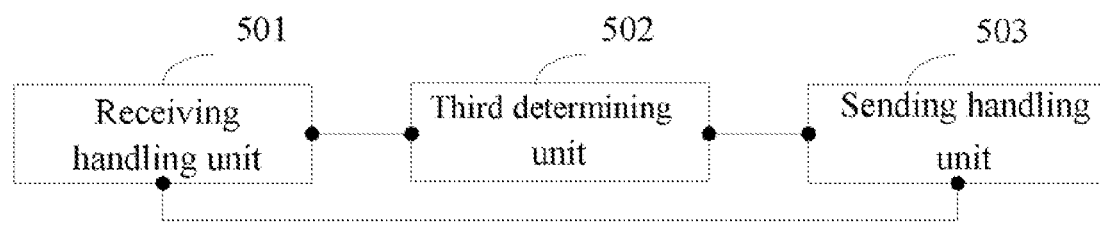
FIG. 5 is a structural schematic diagram of a call device for a private branch exchange user according to another embodiment of the present invention.

FIG. 5 is a structural schematic diagram of a call device for a private branch exchange user according to another embodiment of the present invention, including:

a receiving handling unit 501, configured to: receive a data query request sent by a CSCF, where the data query request includes a number of a private branch exchange user, the data query request is sent by the CSCF after the CSCF receives a call request sent by the private branch exchange user, and the call request includes the number of the private branch exchange user; receive a user data request from an AS, where the user data request includes the number of the private branch exchange user, and the user data request is sent by the AS after the AS receives the call request forwarded by the CSCF;

a third determining unit 502, configured to determine whether user data of the private branch exchange user includes a flag bit after the receiving handling unit 501 receives the user data request, where the flag bit is used to indicate that the user data of the private branch exchange user is open to the AS; and a sending handling unit 503, configured to send a data query success response to the CSCF after the receiving handling unit 501 receives the data query request and determines that the private branch exchange user has opened an account but not registered, where the data query success response includes information about a wildcard user corresponding to the private branch exchange user; send a user data response to the AS when the third determining unit 502 determines that the user data of the private branch exchange user includes the flag bit, where the user data response includes the user data of the private branch exchange user.

Sending the data query success response to the CSCF enables the CSCF to forward the call request to the AS; sending the user data response to the AS enables the AS to use the user data of the private branch exchange user to continue normal calling.

It may be learned from the above that, after receiving a data query request sent by the CSCF, the call device for the private branch exchange user in the embodiment of the present invention sends a data query response that includes information of the wildcard user corresponding to the private branch exchange user to the CSCF even if the private branch exchange user has not registered on the call device for the private branch exchange user, so that the CSCF may forward the call request to the AS to continue a call; after the user data request sent by the AS is received, user data of the private branch exchange user may be sent to the AS even if the private branch exchange user has not registered on the call device for the private branch exchange user, so that the AS may use the user data of the private branch exchange user to continue normal calling. In this way, the PBX user can successfully make a call without independent registration when implementing independent supplementary services, and the PBX can initiate a registration process of only one user, thereby reducing the handling load of network elements and complying with operation rules for an enterprise PBX.

Another embodiment of the present invention further provides a call device for a private branch exchange user. The call device for the private branch exchange user includes at least two of the determining units: the first determining unit 302 second determining unit 402, and third determining unit 502; when both the first determining unit 302 and second determining unit 402 are included, the determining sequences of the first determining unit 302 and second determining unit 402 may be random, that is, the first determining unit 302 may first make determination and the second determining unit 402 then makes determination; or the second determining unit 402 may first make determination and the first determining unit 302 then makes determination.

Figure 6:
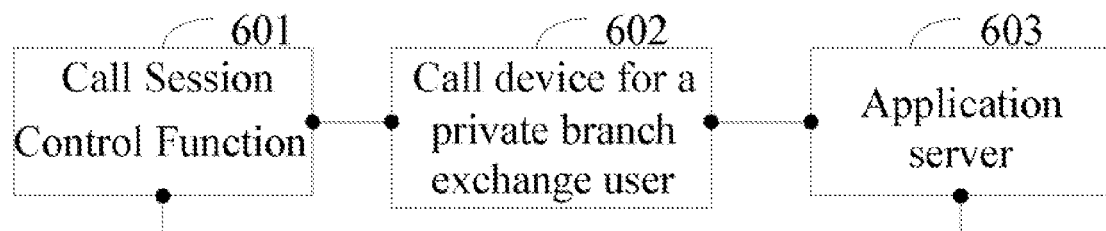
FIG. 6 is a structural schematic diagram of a communication system according to an embodiment of the present invention.

An embodiment of the present invention further provides a communication system. FIG. 6 describes a structure of the communication system provided in an embodiment of the present invention, including:

a Call Session Control Function 601, configured to: receive a call request sent by a private branch exchange user, where the call request includes a number of the private branch exchange user; send a data query request to a call device for the private branch exchange user 602, where the data query request includes the number of the private branch exchange user; receive a data query success response sent by the call device for the private branch exchange user 602, where the data query success response includes information about a wildcard user corresponding to the private branch exchange user; and forward the call request to an application server 603;

the call device for the private branch exchange user 602, configured to: receive the data query request; send the data query success response to the Call Session Control Function 601; receive a user data request from the application server 603, where the user data request includes the number of the private branch exchange user; and send a user data response to the application server 603, where the user data response includes user data of the private branch exchange user; and the application server 603, configured to: receive the call request, and send the user data request to the call device for the private branch exchange user 602; receive the user data response, and use the user data of the private branch exchange user to continue normal calling.

It may be learned from the above that, after receiving a data query request sent by the CSCF, the call device for the private branch exchange user in the embodiment of the present invention sends a data query response that includes information of the wildcard user corresponding to the private branch exchange user to the CSCF even if the private branch exchange user has not registered on the call device for the private branch exchange user, so that the CSCF may forward the call request to the AS to continue a call; after the user data request sent by the AS is received, user data of the private branch exchange user may be sent to the AS even if the private branch exchange user has not registered on the call device for the private branch exchange user so that the AS may use the user data of the private branch exchange user to continue normal calling, in this way, the PBX user can successfully make a call without independent registration when implementing independent supplementary services, and the PBX can initiate a registration process of only one user, thereby reducing the handling load of network elements and complying with operation rules for an enterprise PBX.

Content such as information exchange and execution procedures between all modules in the device and system is based on a concept same as the method embodiments of the present invention. For the specific content, reference may be made to the descriptions in the method embodiments of the present invention. The content is not described herein again.

Those killed in the art may understand that all or part or the steps in the preceding method may be completed by using a program to instruct the hardware. The program may be stored in a computer readable storage medium. The procedure for executing the program may include the flows of the methods provided in all embodiments of the present invention. The storage medium may be magnetic disk, compact disk, read-only memory (ROM: Read-Only Memory), or random access memory (RAM: Random Access Memory), and so on.

This document uses specific examples to illustrate the principles and implementation modes of the present invention. Descriptions of the preceding embodiments are merely intended to help understand the method of the present invention and its principles. Meanwhile, for a person skilled in the art, according, to the principles of the present invention, changes may be made to specific implementation methods and application scope. To sum up, the content in the specifications shall not be understood as restrictions for the present invention.

What is claimed is:

1. A call method for a private branch exchange user, comprising:
   receiving a data query request from a Call Session Control Function, wherein the data query request comprises a number of a private branch exchange user, the data query request is sent by the Call Session Control Function after the Call Session Control Function receives a call request from the private branch exchange user, and the call request comprises the number of the private branch exchange user;
   if the private branch exchange user has opened an account but not registered, sending a data query success response to the Call Session Control Function so that the Call Session Control Function forwards the call request to an application server, wherein the data query success response comprises information about a wildcard user corresponding to the private branch exchange user;
   receiving, a user data request from the application server, wherein the user data request comprises the number of the private branch exchange user, and the user data request is sent by the application server after the application server receives the call request forward by the Call Session Control Function; and
   sending a user data response to the application server, wherein the user data response comprises user data of the private branch exchange user.

2. The call method for the private branch exchange user according to claim 1, wherein before the sending the data query success response to the Call Session Control Function, the method further comprises:
   determining whether the user data of the private branch exchange user comprises a flag bit, wherein the flag bit is for indicating that the user data of the private branch exchange user is not open to the Call Session Control Function; and
   if the user data of the private branch exchange user comprises the flag bit, sending the data query success response to the Call Session Control Function.

3. The call method for the private branch exchange user according to claim 2, wherein the data query request is sent via a CX or DX interface;
   the flag hit indicates that the user data of the private branch exchange user is not open to the Call Session Control Function by indicating that the user data is not open to a network element connected by the CX or DX interface.

4. The call method for the private branch exchange user according to claim 1, wherein before the sending the data query success response to the Call Session Control Function, the method further comprises:
   determining whether the wildcard user corresponding to the private branch exchange user has already registered; and
   if the wildcard user corresponding to the private branch exchange user has already registered, sending the data query success response to the Call Session Control Function.

5. The call method for the private branch exchange user according to claim 1, wherein before the sending the data query success response to the Call Session Control Function, the method further comprises:
   determining whether the wildcard user corresponding to the private branch exchange user has already registered and whether the user data of the private branch exchange user comprises a flag bit, wherein the flag hit is for indicating that the user data of the private branch exchange user is not open to the Call Session Control Function; and
   if the wildcard user corresponding to the private branch exchange user has already registered and the user data of the private branch exchange user comprises the flag bit, sending the data query success response to the Call Session Control Function.

6. The call method for the private branch exchange user according to claim 1, wherein before the sending the user data response to the application server, the method further comprises:
   determining whether the user data of the private branch exchange user comprises a flag bit, wherein the flag bit is for indicating that the user data of the private branch exchange user is open to the application server; and
   if the user data of the private branch exchange user comprises the flag bit, sending the user data response to the application server.

7. The call method for the private branch exchange user according to claim 6, wherein the user data request is sent via an SH interface;
   the flag bit indicates that the user data of the private branch exchange user is open to the application server by indicating that the user data is open to a network element connected by the SH interface.

8. A call device for a private branch exchange user, comprising:
   a receiving handling unit, configured to: receive a data query request from a Call Session Control Function, wherein the data query request comprises a number of a private branch exchange user, the data query request is sent by the Call Session Control Function after the Call Session Control Function receives a call request from the private branch exchange user, and the call request comprises the number of the private branch exchange user; receive a user data request from an application server, wherein the user data request comprises the number of the private branch exchange user; and the user data request is sent by the application server after the application server receives the call request forwarded by the Call Session Control Function; and
   a sending handling unit, configured to: after the receiving handling unit receives the data query request and determines that the private branch exchange user has opened an account but not registered, send a data query success response to the Call Session Control Function so that the Call Session Control Function forwards the call request to the application server, wherein the data query success response comprises information about a wildcard use corresponding to the private branch exchange user; send a user data response to the application server, wherein the user data response comprises user data of the private branch exchange user.

9. The call device for the private branch exchange user according to claim 8, further comprising:
   a first determining unit, configured to determine whether the user data of the private branch exchange user comprises a flag bit after the receiving handling unit receives the data query request, wherein the flag bit is for indicating that the user data of the private branch exchange user is not open to the Call Session Control Function; and
   wherein the sending handling unit is configured to send the data query success response to the Call Session Control Function when the first determining unit determines that the user data of the private branch exchange user comprises the flag bit.

10. The call device for the private branch exchange user according to claim 8, further comprising:
   a second determining unit, configured to determine whether the wildcard user corresponding to the private branch exchange user has already registered after the receiving handling unit receives the data query request;
   wherein the sending handling unit is configured to send the data query success response to the Call Session Control Function when the second determining unit determines that the wildcard user corresponding to the private branch exchange user has already registered.

11. The call device for the private branch exchange user according to claim 8, further comprising:
   a first determining unit, configured to determine whether the user data of the private branch exchange user comprises a flag bit after the receiving handling unit receives the data query request, wherein the flag bit is for indicating that the user data of the private branch exchange user is not open to the Call Session Control Function; and
   a second determining unit, configured to determine whether the wildcard user corresponding to the private branch exchange user has already registered after the receiving handling unit receives the data query request;
   wherein the sending, handling unit is configured to send the data query success response to the Call Session Control Function when the first determining unit determines that the user data of the private branch exchange user comprises the flag bit and the second determining unit determines that the wildcard user corresponding to the private branch exchange user has already registered.

12. The call device for the private branch exchange user according to claim 8, further comprising:
   a third determining unit, configured to determine whether the user data of the private branch exchange user comprises a flag hit after the receiving handling unit receives the user data request, wherein the flag bit is for indicating that the user data of the private branch exchange user is open to the application server; and
   wherein the sending, handling unit is configured to send the user data response to the application server when the third determining unit determines that the user data of the private branch exchange user comprises the flag bit.

13. A communication system, comprising:
   a Call Session Control Function, configured to: receive a call request from a private branch exchange user, wherein the call request: comprises a number of the private branch exchange user; send a data query request to a call device for the private branch exchange user, wherein the data query request comprises the number of the private branch exchange user; receive a data query success response from the call device for the private branch exchange user, wherein the data query success response comprises information about a wildcard user corresponding to the private branch exchange user; and forward the call request to an application server;
   the call device for the private branch exchange user, configured to: receive the data query request; send the data query success response to the Call Session Control Function; receive a user data request from the application server, wherein the user data request comprises the number of the private branch exchange user; and send a user data response to the application server, wherein the user data response comprises user data of the private branch exchange user; and
   the application server, configured to: receive the call request, and send the user data request to the call device for the private branch exchange user; receive the user data response, and use the user data of the private branch exchange user to continue calling.

* * * * *

UNITED STATES PATENT AND TRADEMARK OFFICE
CERTIFICATE OF CORRECTION

PATENT NO.        : 8,477,925 B2                                                    Page 1 of 1
APPLICATION NO.   : 13/633346
DATED             : July 2, 2013
INVENTOR(S)       : Fangui Zeng It is certified that error appears in the above-identified patent and that said Letters Patent is hereby corrected as shown below:

In the Specification
Column 3, line 18, after "user", delete ". Where" and insert -- , where --;
Column 6, line 19, delete "interlace" and insert -- interface --;
Column 7, line 36, delete "+867552878!*!huawei" and insert -- +867552878!.*!@huawei.com --;
Column 7, line 38, delete "hit" and insert -- bit --;
Column 7, line 54, delete "+867552878!.*!huawei.com" and insert
-- +867552878!.*!@huawei.com --;
Column 7, line 56, delete "hit" and insert -- bit --;
Column 8, line 57, delete "handbag" and insert -- handling --;
Column 12, line 48, delete "killed" and insert -- skilled --;

In the Claims
Column 13, Claim 1, line 45, delete "forward" and insert -- forwarded --;
Column 13, Claim 5, line 67, delete "hit" and insert -- bit --;
Column 14, Claim 8, line 52, delete "use" and insert -- user --;
Column 15, Claim 11, line 28, after "sending" delete ",";
Column 16, Claim 12, line 1, delete "hit" and insert -- bit --; and
Column 16, Claim 12, line 5, after "sending" delete ",".

Signed and Sealed this
Thirty-first Day of December, 2013

Margaret A. Focarino
*Commissioner for Patents of the United States Patent and Trademark Office*